United States Patent
Xu et al.

(10) Patent No.: US 9,711,881 B2
(45) Date of Patent: Jul. 18, 2017

(54) TRAY WITH LOW COST USED IN A TRAY-TYPE CARD CONNECTOR

(71) Applicant: FOXCONN INTERCONNECT TECHNOLOGY LIMITED, Grand Cayman (KY)

(72) Inventors: Zhan-Jun Xu, Xianyang (CN); Fu-Jin Peng, Shenzhen (CN); Li-Jun Li, Shenzhen (CN); Fu-Rong Feng, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/252,851

(22) Filed: Aug. 31, 2016

(65) Prior Publication Data

US 2017/0062958 A1 Mar. 2, 2017

(30) Foreign Application Priority Data

Sep. 1, 2015 (CN) .......................... 2015 1 0549619

(51) Int. Cl.
*H01R 13/73* (2006.01)
*H01R 12/72* (2011.01)
*H01R 13/516* (2006.01)

(52) U.S. Cl.
CPC ......... *H01R 12/721* (2013.01); *H01R 13/516* (2013.01)

(58) Field of Classification Search
CPC .... H01R 12/721; H01R 13/516; H01R 27/00; G06K 7/10237; G06K 13/08
USPC ........................................... 439/571
See application file for complete search history.

(56) References Cited

U.S. PATENT DOCUMENTS

| | | | |
|---|---|---|---|
| 2005/0003711 A1* | 1/2005 | Chang | G06K 13/08 439/630 |
| 2005/0263597 A1* | 12/2005 | Tanaka | G06K 13/08 235/441 |
| 2010/0032485 A1* | 2/2010 | Liao | G06K 13/08 235/441 |
| 2010/0044444 A1* | 2/2010 | Jain | G06K 7/10237 235/492 |
| 2011/0053388 A1* | 3/2011 | Zhu | H01R 27/00 439/62 |

* cited by examiner

*Primary Examiner* — Jean F Duverne
(74) *Attorney, Agent, or Firm* — Wei Te Chung; Ming Chieh Chang (57) ABSTRACT

A tray used in a card connector for receiving a card therein includes a base having opposite top and bottom surfaces, a receiving room for receiving the card therein, and an inner surface surrounding the receiving room and connecting the top surface with the bottom surface. The base defines a plurality of thin portions projecting into the receiving room from the inner surface and a shallow notch recessed in the inner surface to adjacent to one of the plurality of thin portions, the shallow notch runs through both the top surface and the bottom surface. The present invention provides a low cost tray.

13 Claims, 7 Drawing Sheets

ND HTRAY WITH LOW COST USED IN A
TRAY-TYPE CARD CONNECTOR

BACKGROUND OF THE INVENTION

1. Field of the Invention

The present invention relates generally to a tray, and more particularly to a tray with low cost used in a tray-type card connector for receiving a card therein.

2. Description of Related Arts

A mobile phone with dual SIM (Subscriber Identity Module) cards is popular to persons who usually work in different cities. Furthermore, so-called smartphones have various functions to meet customers' requirements. For example, an SD card (Secure Digital Memory Card) is used for enlarging storage of the smartphone in addition to a SIM card used for user's identification.

Nowadays, tray is popular used in a tray-type card connector for receiving at least one card therein. On the other hand, the increased tray may increase cost of the tray-type card connector.

Hence, a tray with low cost is desired.

SUMMARY OF THE INVENTION

Accordingly, an object of the present invention is to provide a tray with low cost to keep the cost of the tray-type card connector down.

To achieve the above object, a tray used in a card connector for receiving a card therein includes a base having opposite top and bottom surfaces, a receiving room for receiving the card therein, and an inner surface surrounding the receiving room and connecting the top surface with the bottom surface. The base defines a plurality of thin portions projecting into the receiving room from the inner surface and a shallow notch recessed in the inner surface to adjacent to one of the plurality of thin portions, the shallow notch runs through both the top surface and the bottom surface.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
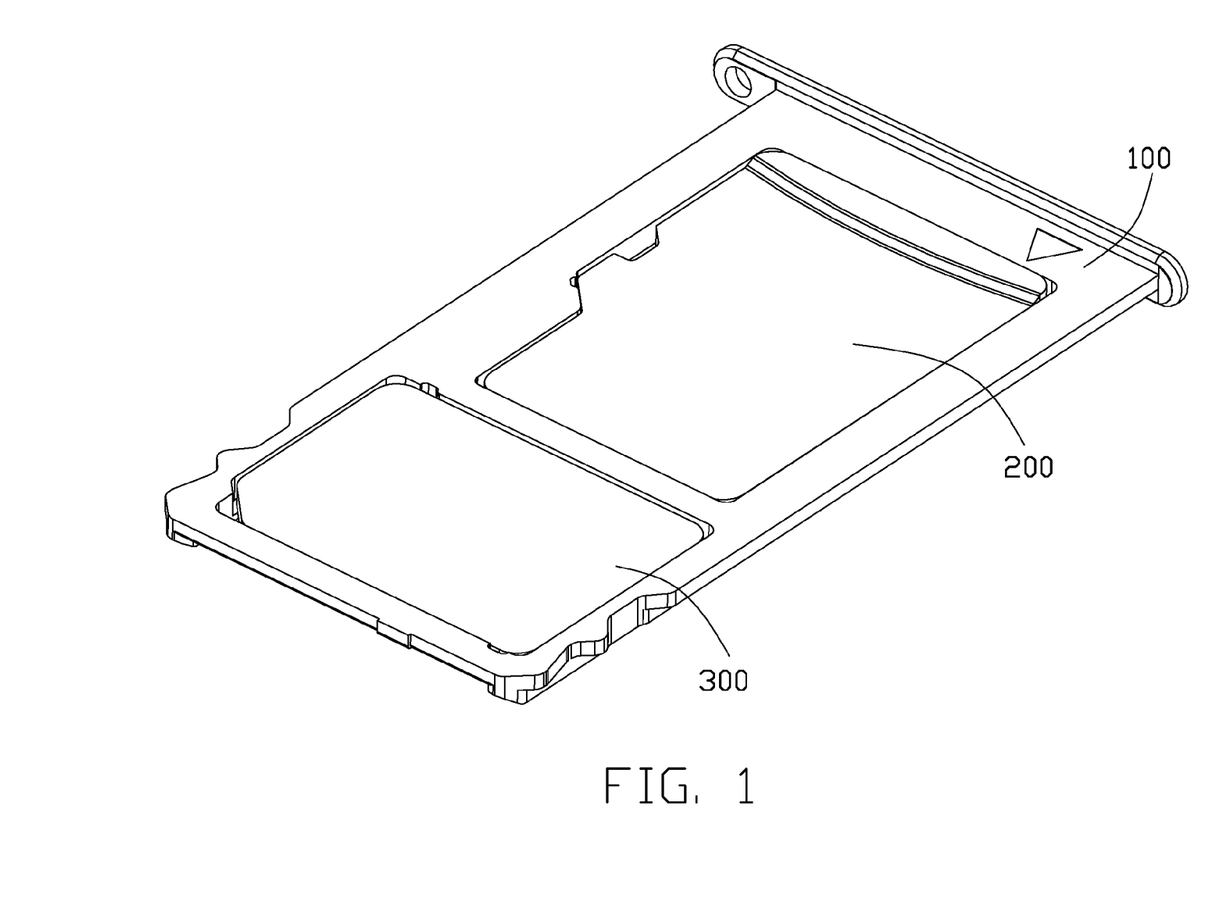
FIG. 1 is a perspective, assembled view of a tray in accordance with the present invention with two type of cards received therein.
Figure 2:
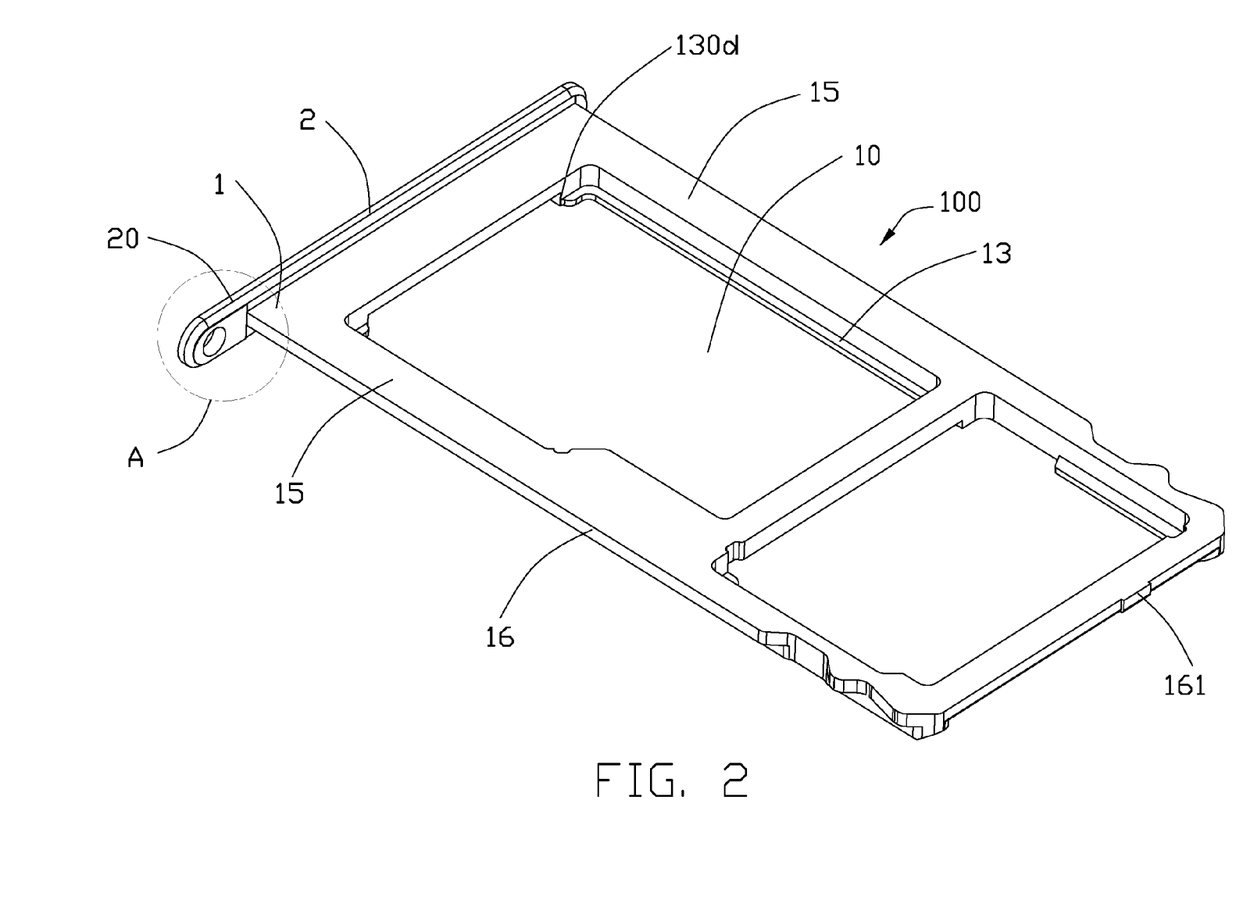
FIG. 2 is a perspective, assembled view of the tray shown in FIG. 1.
Figure 3:
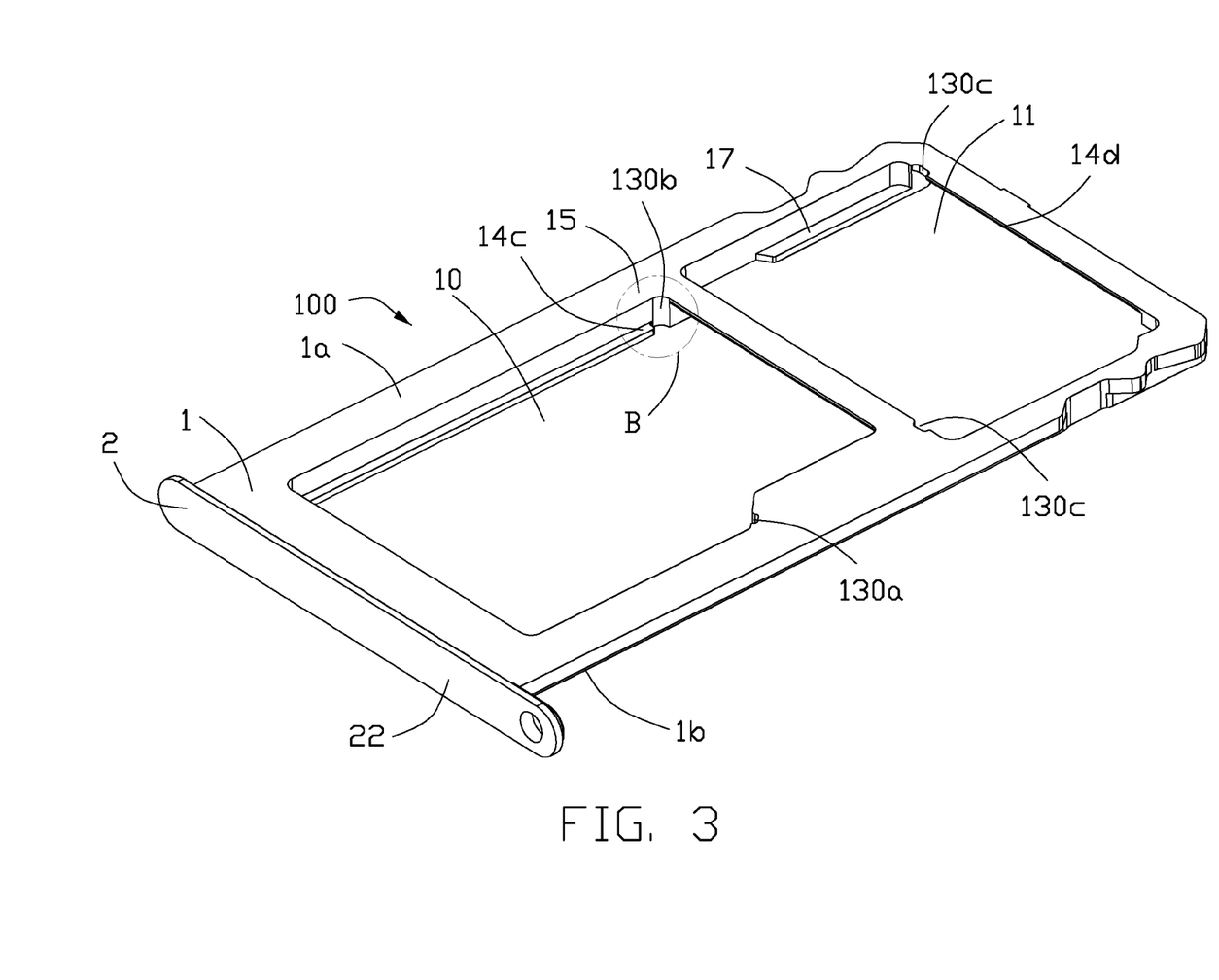
FIG. 3 is another perspective, assembled view of the tray shown in FIG. 1.
Figure 4:
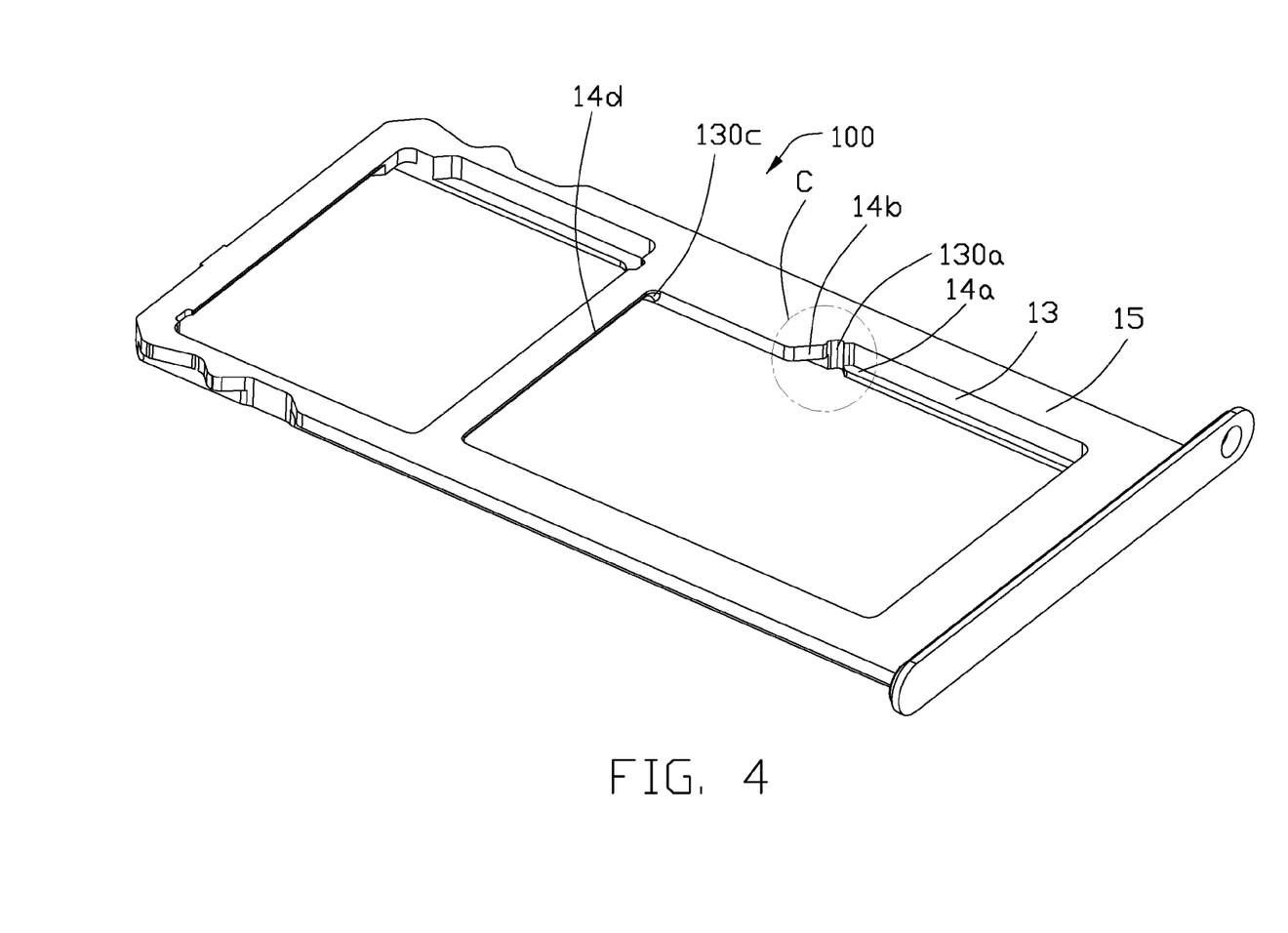
FIG. 4 is a third perspective, assembled view of the tray shown in FIG. 1.
Figure 5:
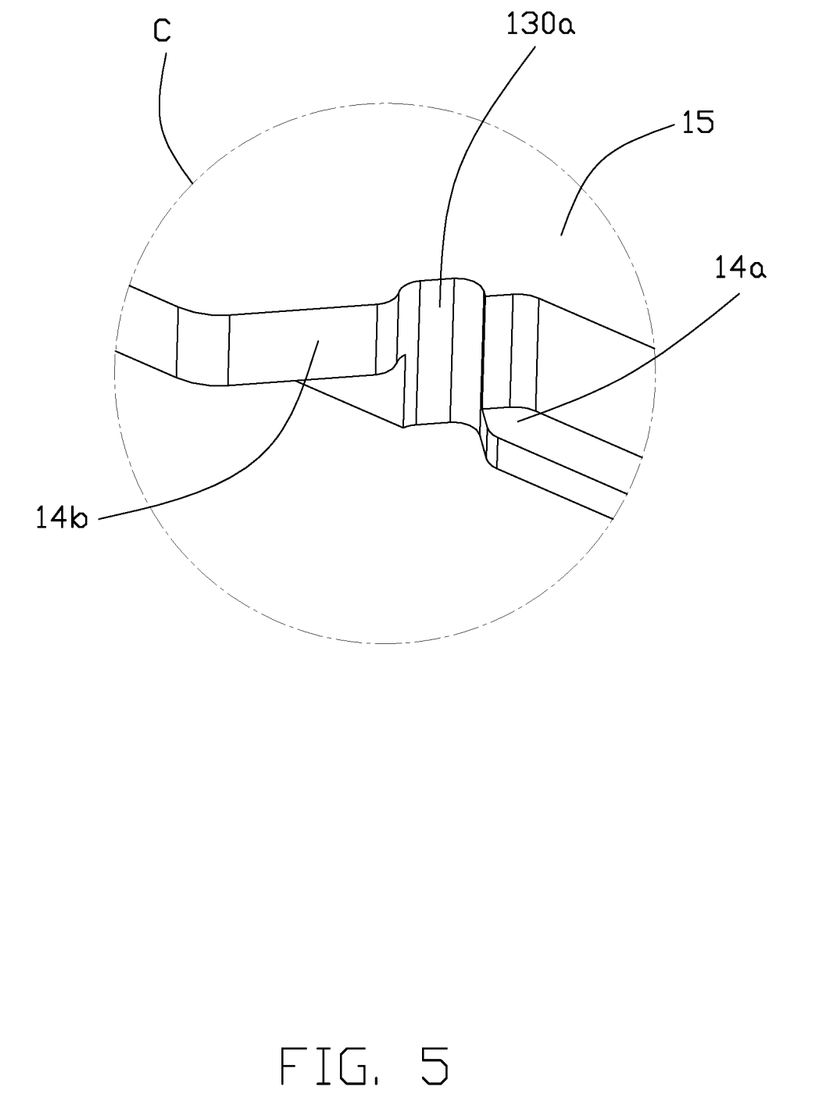
FIG. 5 is an enlarged view of the portion shown in circle C of FIG. 4.
Figure 6:
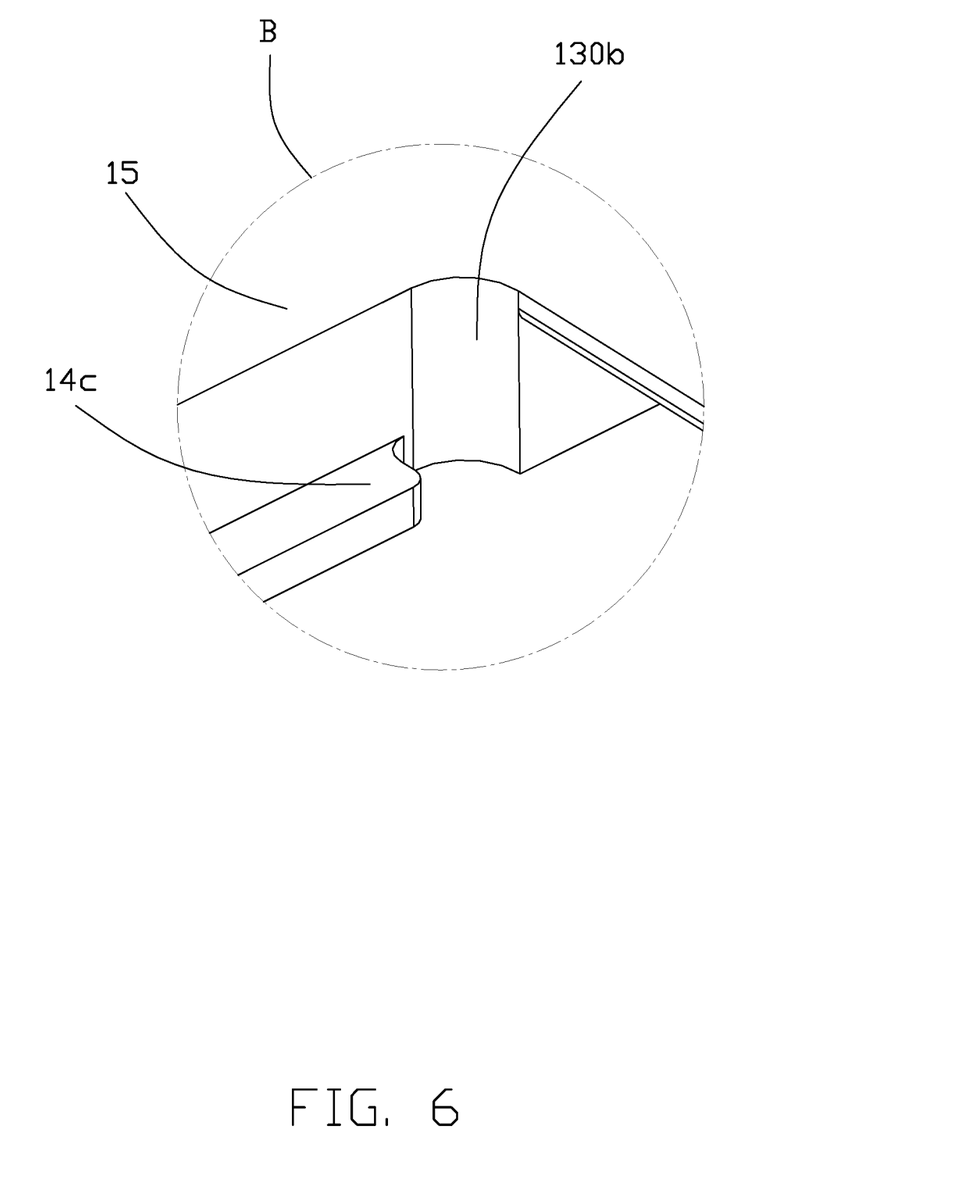
FIG. 6 is an enlarged view of the portion shown in circle B of FIG. 3.

Referring to FIG. 1 and FIG. 2, a tray 100 in accordance with the present invention used in a tray-type card connector (not shown) for simultaneously receiving a first card 200 and a second card 300 is disclosed.

Referring to FIG. 1 to FIG. 4, the tray 100 is formed by metal piece via a cold forging and stamping process. The tray 100 includes a base 1 for receiving the first and second cards 200, 300 therein and a door portion 2 connecting with the base 1. The base 1 defines a top surface 1a, a bottom surface 1b opposite to the top surface 1a, a first receiving room 10 for receiving the first card 200 therein and an inner surface 13 connecting the top surface 1a with the bottom surface 1b and surrounding the first receiving room 10. A plurality of thin portions project from the inner surface 13, and a plurality of shallow notches 130a, 130b, 130c, 130d are recessed in the inner surface 13 to adjacent to the corresponding plurality of thin portions. Each of the shallow notches 130a, 130b, 130c and 130d runs through both the top surface 1a and the bottom surface 1b along a vertical direction and is formed by a stamping process. With respect to the round design, these shallow notches 130a, 130b, 130c and 130d are more recessed from the inner surface 13. These shallow notches 130a, 130b, 130c and 130d are benefit for flowing of the metal marital during making the tray 100 by the cold forging and stamping process, which can prevent the top or bottom surface 1a, 1b from splitting and can provide the low cost tray 100.

Referring to FIG. 2 to FIG. 6, the plurality of thin portions include a first thin portion 14a adjacent to the bottom surface 1b and a second thin portion 14b adjacent to the top surface 1a, both the first thin portion 14a and the second thin portion 14b project into the first receiving room 10 from the inner surface 13. A first end of the first thin portion 14a is adjacent to a first end of the second thin portion 14b, and one of the shallow notches 130a is disposed between and connect the first end of the first thin portion 14a and the first end of the second thin portion 14b. The first thin portion 14a connects a lower portion of the shallow notch 130a for supporting the first card 200 received in the first receiving room 10, and the second thin portion 14b connects an upper portion of the shallow notch 130a for preventing the mis-installing of the first card 200. The shallow notch 130a provides a room to prevent the upper mold core engage or hit the lower mold core while forming the first thin portion 14a and the second thin portion 14b during the cold forging and stamping process, which can protect the upper and lower mold cores and improve mass productivity.

The plurality of thin portions include a third thin portion 14c adjacent to the bottom surface 1b and projecting into the first receiving room 10 from the inner surface 13. One of the shallow notches 130b is disposed adjacent to a first end of the third thin portion 14c, and another shallow notch 130d is disposed adjacent to a second end of the third thin portion 14c. The third thin portion 14c is used for supporting the first card 200. The plurality of thin portions include a fourth thin portion 14d recessed from the inner surface 13 to adjacent to the top surface 1a, and one of the shallow notches 130c is set at one end of the fourth thin portion 14d. The set of the shallow notches 130b, 130c can prevent a right angles punching during the cold forging and stamping process, which is benefit for protecting the mold core. The shallow notch 130d provides a room to prevent the upper mold core engage or hit the lower mold core while forming the third thin portion 14c during the cold forging and stamping process, which can protect the upper and lower mold cores and improve mass productivity.

The base 1 includes a first frame portion 15 extending in a front-to-rear direction, and the first thin portion 14a, the second thin portion 14b and the shallow notch 130a disposed between the first and second thin portions 14a, 14b all are set in the first frame portion 15 along the front-to-rear direction. The base 1 defines an outer surface 16 opposite to the inner surface 13, and a protruding portion 161 is formed in the outer surface 16 via the cold forging and stamping process. A shallow notch 130a/130b/130c/130d also can be set at a joint of the base 1 and the door portion 2 in the outer surface 16 thereof.

Figure 7:
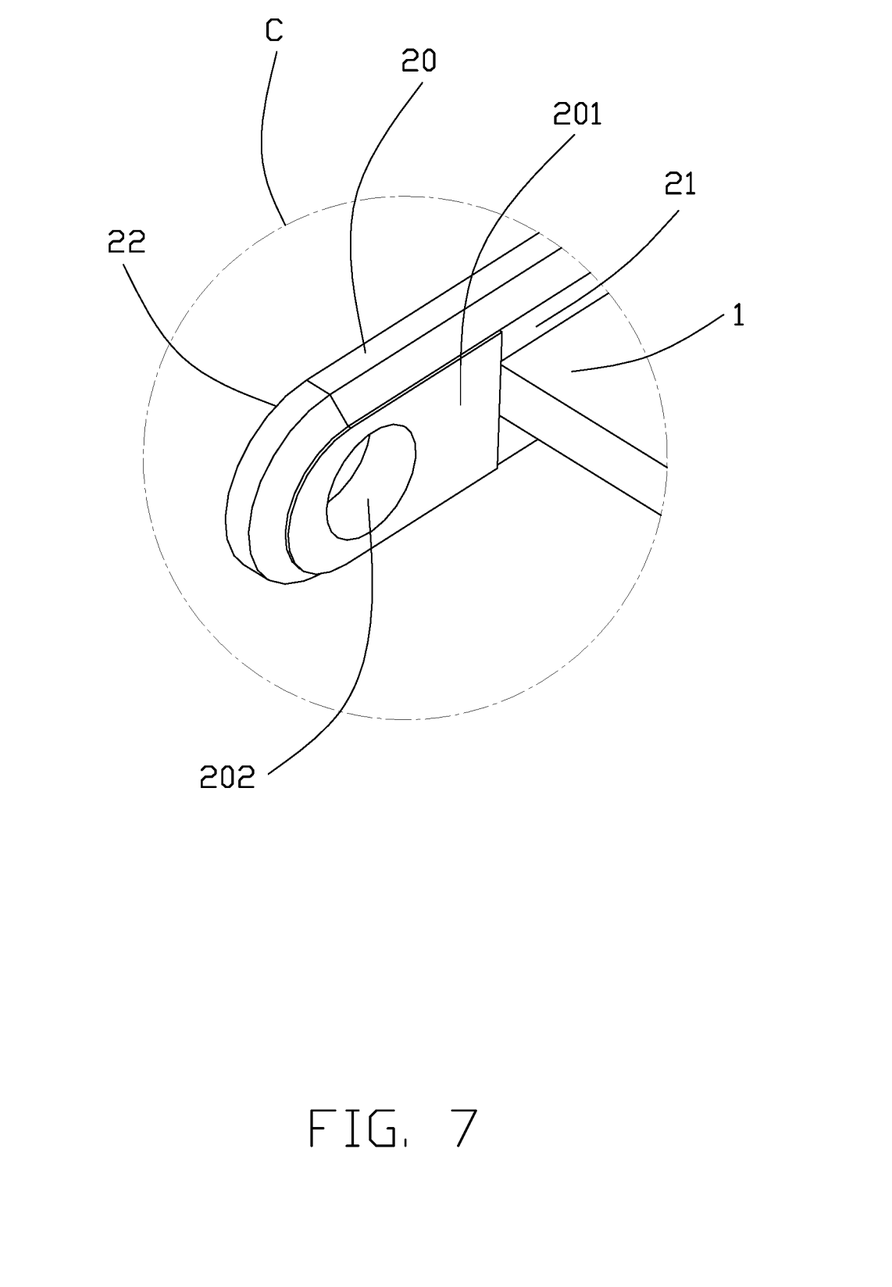
FIG. 7 is an enlarged view of the portion shown in circle A of FIG. 2.

Referring to FIG. 7, the door portion 2 extends along a transverse direction perpendicular to both the front-to-rear direction and the vertical direction and defines an operating portion/extending portion 20 extending beyond the base 1. The door portion 2 defines a first face 21 connecting with the base 1, a second face 201 formed in the operating portion/extending portion 20 and disposed at a same side of the door portion 2 with the first face 21, and an external face 22 opposite to both the first face 21 and the second face 201. The first face 21 and the external face 22 are respectively disposed at two opposite sides of the door portion 2. The first face 21 and the second face 201 are disposed in different planers to produce a step therebetween. The first face 21 is closer to the external face 22 than that of the second face 201 in the front-to-rear direction. The second face 201 is defined as a positioning surface for setting the tray 100 to ensure that the external face 22 is exposed as an external surface of a corresponding electronic device. An operating hole 202 is defined in the operating portion/extending portion 20, and the tray 100 can be pulled out of the corresponding electronic device by a tool operating to the operating hole 202. The base 1 is disposed in a planar provided by the metal sheet, and the door portion 2 is forged and stamped from the metal sheet to perpendicular to the planer, in other words, the base 1 is perpendicular to the door portion 2.

The base 1 defines a second receiving room 11 for receiving the second card 300, and the second receiving room 11 arranges with the receiving room 10 in a side by side manner along the front-to-rear direction. Similar to the inner surface 13, the shallow notches and the thin portions also are formed in the second inner surface 17 of the second receiving room 11. In other embodiment, the tray 100 can be provided with only the receiving room 10 or the second receiving room 11.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A tray used in a card connector for receiving a card therein, comprising:
    a base having opposite top and bottom surfaces, a receiving room for receiving the card therein, and an inner surface surrounding the receiving room and connecting the top surface with the bottom surface;
    wherein the base defines a plurality of thin portions projecting into the receiving room from the inner surface and a shallow notch recessed in the inner surface to adjacent to one of the plurality of thin portions, the shallow notch runs through both the top surface and the bottom surface;
    wherein the plurality of thin portions include a first thin portion adjacent to the bottom surface and a second thin portion adjacent to the top surface, both the first thin portion and the second thin portion project into the first receiving room from the inner surface, and a first end of the first thin portion is adjacent to a first end of the second thin portion, and the shallow notches is disposed between the first end of the first thin portion and the first end of the second thin portion; wherein the base includes a first frame portion extending in a front-to-rear direction, and the first thin portion, the second thin portion and the shallow notch disposed between the first and second thin portions all are set in the first frame portion along the front-to-rear direction.

2. The tray as claimed in claim 1, wherein the plurality of thin portions include a third thin portion adjacent to the bottom surface and projecting into the first receiving room from the inner surface, and the shallow notch is disposed adjacent to a first end of the third thin portion.

3. The tray as claimed in claim 2, wherein another shallow notch is disposed adjacent to a second end of the third thin portion.

4. The tray as claimed in claim 1, wherein the plurality of thin portions include a fourth thin portion recessed from the inner surface to adjacent to the top surface, and the shallow notches is set adjacent to one end of the fourth thin portion.

5. The tray as claimed in claim 1, wherein the base defines an outer surface opposite to the inner surface, and a protruding portion is formed in the outer surface via a cold forging and stamping process.

6. A tray used in a card connector for receiving a card therein, comprising:
    a base extending in a front-to-rear direction and having a receiving room for receiving the card; and
    a door portion connecting with the base and extending along a transverse direction perpendicular to the front-to-rear direction to provide a extending portion disposed beyond the base along the transverse direction, the door portion defines a first face connecting with the base, a second face formed in the extending portion and disposed at a same side of the door portion with the first face, and an external face opposite to both the first face and the second face;
    wherein the first face and the external face are respectively disposed at two sides of the door portion, and the first face and the second face are disposed in different planers to produce a step therebetween;
    wherein the base defines an inner surface surrounding the receiving room, and a plurality of thin portions project into the receiving room from the inner surface for supporting the card; wherein a shallow notch is recessed in the inner surface to adjacent to one of the plurality of thin portions, and the shallow notch runs through the base along a vertical direction and is formed by a stamping process.

7. The tray as claimed in claim 6, wherein the first face is closer to the external face than that of the second face in the front-to-rear direction.

8. The tray as claimed in claim 6, wherein the second face is defined as a positioning surface for setting the tray to ensure that the external face is exposed as an external surface of a corresponding electronic device.

9. The tray as claimed in claim 6, wherein the base is perpendicular to the door portion.

10. A tray used in a card connector for receiving a card therein, comprising:
    a base having opposite top and bottom surfaces in a vertical direction, a receiving room for receiving the card therein, and an inner surface inwardly facing the receiving room and connecting the top surface with the bottom surface;

a first thin portion unitarily extending inwardly from the inner surface into the receiving room, said first thin portion having a first top face coplanar with the top surface and a first bottom face upwardly spaced from the bottom surface in said vertical direction; and a second thin portion unitarily extending inwardly from the inner surface into the receiving room, said second thin portion having a second bottom face coplanar with the bottom surface and a second top face downwardly spaced from the top surface in said vertical direction; wherein a first end of the first thin portion is adjacent to a second end of the second thin portion and a notch is formed in the inner surface between said first end and said second end; wherein said notch includes a first round region transversely joined with the first end, and a second round region transversely joined with the second end;

wherein a sum of a first thickness of the first thin portion and a second thickness of the second thin portion is smaller than a thickness of the base in the vertical direction; wherein said first thin portion forms a slender configuration extending along a first longitudinal direction, and said second thin portion forms another slender configuration extending along a second longitudinal direction perpendicular to said first longitudinal direction.

11. The tray as claimed in claim 10, wherein said notch forms a flat region between the first round region and the second round region.

12. The tray as claimed in claim 10, wherein said notch extends through both the top surface and the bottom surface in the vertical direction.

13. The tray as claimed in claim 10, wherein said first thin portion forms a slender configuration extending along a first longitudinal direction, and said second thin portion forms another slender configuration extending along a second longitudinal direction parallel to said first longitudinal direction.

* * * * *